United States Patent
Lake et al.

(10) Patent No.: US 8,398,050 B2
(45) Date of Patent: Mar. 19, 2013

(54) HOLD OPEN CONFIGURATION FOR SAFETY VALVE AND METHOD

(75) Inventors: Gary Lake, Houston, TX (US); Priyesh Ranjan, Houston, TX (US); Kenneth Wilson, Houston, TX (US); Michael Rainone, Palestine, TX (US); Phillip Grisham, Bullard, TX (US); Samuel Sackett, Frankston, TX (US)

(73) Assignee: Baker Hughes Incorporated, Houston, TX (US)

( * ) Notice: Subject to any disclaimer, the term of this patent is extended or adjusted under 35 U.S.C. 154(b) by 705 days.

(21) Appl. No.: 12/540,945

(22) Filed: Aug. 13, 2009

(65) Prior Publication Data

US 2011/0037005 A1 Feb. 17, 2011

(51) Int. Cl.
 *F16K 31/08* (2006.01)
(52) U.S. Cl. .................. 251/65; 251/129.03; 166/66.4; 166/66.5; 166/66.7
(58) Field of Classification Search .............. 251/65, 251/129.03; 166/332.8, 332.1, 66.4, 66.5, 166/66.7; 335/229–234
 See application file for complete search history.

(56) References Cited

U.S. PATENT DOCUMENTS

| | | | |
|---|---|---|---|
| 4,579,177 A * | 4/1986 | Going, III | 166/66.5 |
| 4,687,054 A | 8/1987 | Russell et al. | |
| 5,252,043 A | 10/1993 | Bolding et al. | |
| 5,409,356 A | 4/1995 | Massie | |
| 5,620,048 A | 4/1997 | Beauquin | |
| 5,734,209 A | 3/1998 | Hallidy | |
| 5,831,353 A | 11/1998 | Bolding et al. | |
| 5,960,875 A | 10/1999 | Beauquin et al. | |
| 6,619,388 B2 | 9/2003 | Dietz et al. | |
| 6,626,244 B2 * | 9/2003 | Powers | 166/373 |
| 6,926,504 B2 | 8/2005 | Howard | |
| 7,145,271 B2 | 12/2006 | Thirunarayan et al. | |
| 7,316,270 B2 | 1/2008 | Shen | |
| 7,373,971 B2 | 5/2008 | Montgomery | |
| 7,703,532 B2 * | 4/2010 | O'Malley et al. | 166/332.8 |
| 2007/0289734 A1 | 12/2007 | McDonald et al. | |
| 2007/0295515 A1 | 12/2007 | Veneruso et al. | |
| 2008/0157014 A1 * | 7/2008 | Vick et al. | 251/65 |
| 2009/0032238 A1 * | 2/2009 | Rogers et al. | 166/66.6 |
| 2009/0266555 A1 * | 10/2009 | May et al. | 166/373 |
| 2010/0294502 A1 * | 11/2010 | Xu | 166/332.8 |

OTHER PUBLICATIONS

Tom C. Matthew, "Opportunities for the Electric Operation of Valves Associated with Oil & Gas Production", OTC 8769, Presentation at the 1996 Offshore Technology Conference, Houston, Texas, May 4-7, 1998, pp. 471-475.
Mark Rivenbark, Sami Khater, Wesley Dietz, Steven Barnes, An Innovative All Electric Well Production System, SPE 67244, Presentation at the SPE Production and Operations Symposium, Oklahoma City, Oklahoma, Mar. 24-27, 2001.

* cited by examiner

*Primary Examiner* — John K Fristoe, Jr.
*Assistant Examiner* — Jessica Cahill
(74) *Attorney, Agent, or Firm* — Cantor Colburn LLP

(57) ABSTRACT

An actuator and counterbalance system including a nonmobile carrier; a mobile carrier, mobile relative to the non mobile carrier; and a counterbalance system in operable communication with the mobile carrier and configured to counterbalance less than 100 percent of a return force of a tool actuated by the actuator and method.

11 Claims, 1 Drawing Sheet

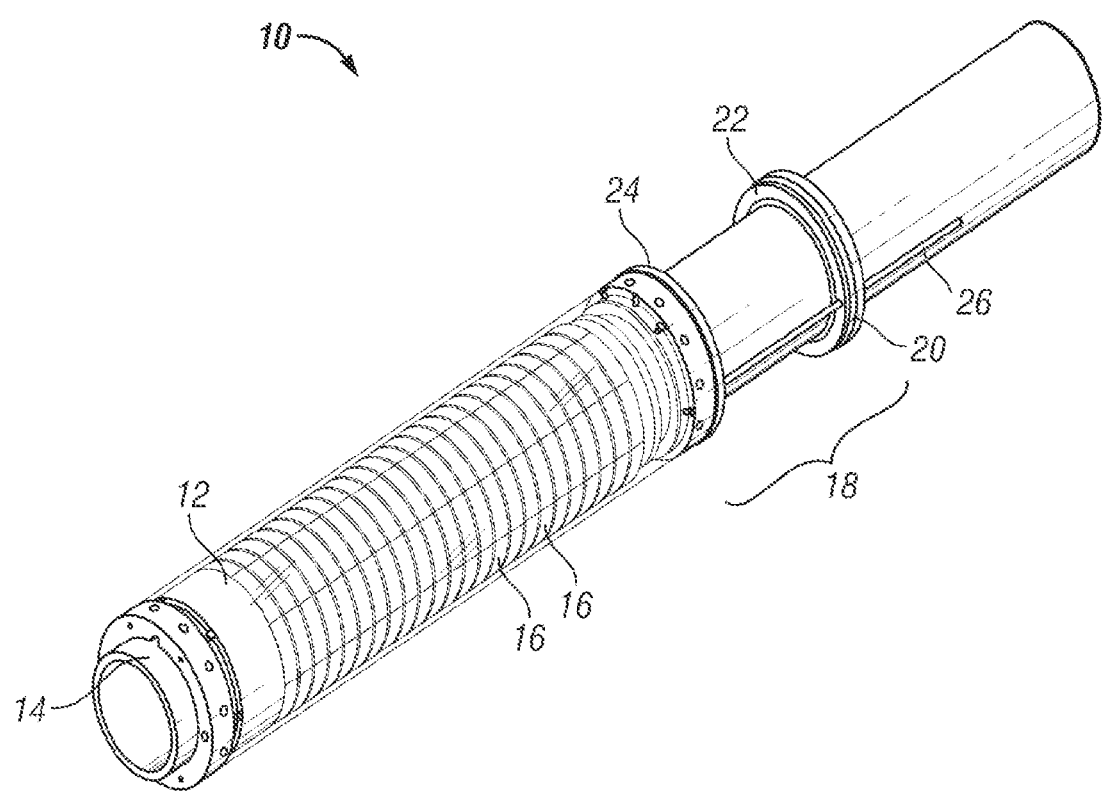

US 8,398,050 B2

HOLD OPEN CONFIGURATION FOR SAFETY VALVE AND METHOD

BACKGROUND

In industries where fluids are piped to other locations and especially when such fluids may be under high pressure and or contain caustic chemical entities, safety valves are employed. Safety Valves are generally components that are openable upon a command and closable automatically upon loss of the command. Action of this nature is commonly termed "failsafe" since the natural condition of the valve is closed and it will move to that position on its own if permitted to do so by a controller associated therewith.

Traditionally safety valves have used hydraulic actuation, which provides a great deal of force potential and a very easy way to maintain the force on a piston of the safety valve. One need simply lock the hydraulic line and the force remains. More recently however, environmental regulations regarding hydraulic oil and industry safety regulations requiring certain large amounts of hydraulic oil on hand have made the use of hydraulic actuators less favored.

Electrically actuated safety valves have become of more interest to many common industries including but not limited to the drilling and completion industry. Different types of electric motors including but not limited to linear motors, rotary motors, etc., have been the subject of increasing interest and have been shown capable of opening a safety valve and failing safe as the loss of power to the system. Due to power requirements for electrical actuators, many of these types of actuators while capable of holding a safety valve open, are not favored. Other devices that rely upon a mechanical interlock arrangement reduce power consumption but are inherently less "failsafe" as the various configurations have friction to overcome to disengage and allow closure of the safety valve. The art would well receive configurations and methods that allow electrically actuated safety valves to be held open without requiring a large power supply and without suffering the introduction of unquantifiable frictional forces in the failsafe mode of the safety valve.

SUMMARY

An actuator and counterbalance system including a nonmobile carrier; a mobile carrier, mobile relative to the non mobile carrier; and a counterbalance system in operable communication with the mobile carrier and configured to counterbalance less than 100 percent of a return force of a tool actuated by the actuator.

A method for reducing power consumption in an electrical actuator used to actuate a tool including powering an electrical actuator; moving a component of a tool attached to the actuator; and maintaining the actuator in an actuated position with a counterbalance system having a holding capacity of less than 100 percent of a return force of a component of the tool actuated by the actuator.

An actuator and counterbalance system including a nonmobile carrier; a mobile carrier, mobile relative to the non mobile carrier; a first portion of a counterbalance system in operable communication with the mobile carrier and configured to counterbalance less than 100 percent of a return force of a tool actuated by the actuator; and a second portion of the counterbalance system configured to hold the balance of the return force not held by the first portion of the counterbalance system.

A counterbalance system including a first structure being one of receptive to a magnetic field or configured to produce a magnetic field; and a second structure being one of receptive to a magnetic field or configured to produce a magnetic field, one of the first structure and the second structure being in operative communication with a mobile portion of an actuator system and the other of the first structure and the second structure being positionally fixed relative to the actuator, the first structure and the second structure when brought together being attractive to one another sufficient to produce a force of less than 100 percent of a return force in a tool actuated by the actuator.

BRIEF DESCRIPTION OF THE DRAWINGS

Referring now to the drawings wherein like elements are numbered alike in the several Figures:

FIG. 1 is a perspective view of an electrical actuator for a safety valve having a hold open configuration as disclosed herein.

DETAILED DESCRIPTION

Referring to FIG. 1, an electric actuator 10 similar to that disclosed in U.S. patent application Ser. No.: 12/540,931, entitled PERMANENT MAGNET LINEAR MOTOR ACTUATED SAFETY VALVE AND METHOD filed Aug. 13, 2009 (the entirety of the disclosure of which is incorporated herein by reference) for a safety valve is illustrated. The actuator 10 is configured with a mobile carrier 12, which may be an outer carrier as illustrated or an inner carrier and a non mobile carrier 14, which may be an inner carrier as illustrated or an outer carrier. The outer and inner carriers are configured to respond to magnetic energy whether based upon permanent magnet based, induced field based, coil based or a combination of any of these. In one particular embodiment, permanent magnets 16 are carried by carrier 12 (visible due to illustration of the carrier 12 as a transparency) and coils are carried by carrier 14. The coils are powered by a source, which may be a surface source or other remote source or a local source, the sources including batteries, generators wired sources such as TEC, optical sources, etc. The coils are controlled to generate magnetic fields in a sequence designed to move the outer carrier 12 toward the fully actuated position, which as illustrated is toward the upper right corner of the drawing FIGURE.

The actuator disclosed herein includes a counterbalance system 18 that itself includes a hold open structure 20, interactive with the mobile carrier, that may be annular as shown or may be another shape and is positioned in spaced relationship with the carrier 12 when in the non actuated position and in proximity or contact with the carrier 12 when in the actuated position. Structure 20 may be mounted to the nonmobile carrier or a tool housing, etc. Positioning of the structure 20 is keyed to the full intended stroke of the carrier 12 and hence in operation is capable of substantially retaining the carrier 12 in the actuated position. The structure 20 comprises either a magnetic field producing configuration or a magnetic field responsive configuration. In an embodiment where the structure 20 is productive of a magnetic field, it may be generated by one or more permanent magnets or one or more coils 22. In an embodiment where the structure 20 comprises a magnetic field responsive configuration, it may be a metal such as for example, steel, iron, etc. A complementary magnetic field producing structure 24 comprising one or more permanent magnets or one or more coils or a complementary magnetic field responsive material is disposed at an end of the carrier 12. For clarity, numeral 22 and 24 may be magnetic, 22 may be magnetic while 24 is responsive, or 22 may be responsive while 24 is magnetic. In an embodiment where both 22 and 24 are productive of magnetic fields, they are oriented to have opposite polarity such that they attract one another. The attractive force of 22 and 24 will provide a holding force to the carrier to contribute to maintenance of the carrier 12 in the actuated position. This embodiment will produce a stronger hold open force than embodiments where only one of 22 or 24 is productive of a magnetic field.

It is to be appreciated that the hold open force "contributes" to the maintenance of the carrier in the described position. It is specifically not of sufficient magnitude to maintain the carrier in the fully actuated position. Stated alternately, the hold open force generated at/with structure 20 represents less than 100 percent of the return force of a tool actuated by the actuator. In the illustrated embodiment, a piston 26 coupled to the movable carrier 12 is provided as a tool component that is actuatable by the actuator 10. This is in order to ensure failsafe operation of a tool actuated thereby such as a safety valve. In one embodiment, the percentage of the return force held by the counterbalance system is greater than about 75 percent to less than 100 percent.

For each particular embodiment in which the device will be used, the attractive force of the magnets 22 and 24 (or responsive structures) should be set at a percentage of a return force component of the tool. For example, if the tool is a safety valve, the power spring will be the return device (well known to one of skill in the art). The power spring will have a spring rate designed into it for the particular valve. For ease of discussion, a round number of 200 pounds is contemplated. The attractive force of magnets 22 and 24 (or responsive structures) must be a percentage of 200 pounds. The greater the percentage, the less power is required in the linear motor to maintain the carrier in the actuated position because the less of the force of the spring is transmitted to the carrier. If the force of the magnets 22 and 24 (or responsive structures) is set to 180 pounds, then there is 20 pounds of spring force that is transmitted to the carrier 12. The amount of power then required to maintain the linear motor or any other electrically based configuration in place need only be sufficient to support a 20 pound load as opposed to a 200 pound load if the counterbalance magnet system were not in place. It is to be understood that the hypothetical 200 pound power spring example is not intended to be limiting in any way but is intended to be merely exemplary.

Because the counterbalance system holds only a portion of the load of a power spring or other return device, failsafe considerations with respect to the counterbalance system are addressed as the counterbalance system itself cannot maintain the carrier 12 in the actuated position but will require power applied to the actuator. Power required by the actuator in this system is significantly lower than it would be in similar systems without the counterbalance system. This is because of the direct reduction of load on the actuator due to the counterbalance. In one embodiment, power consumption will fall from 200 watts to 50 watts or even 20 watts in some iterations due to the counterbalance system. No power is necessarily provided to the counterbalance system and there is no mechanical engagement therein as in prior art hold open configurations.

While an embodiment is shown and described using magnetic field producing structures on both sides of a gap in the nonactuated position, it is to be appreciated that a magnetic field producing structure on one side of the gap, i.e. 22 or 24 and simply a magnetic field responsive material such as iron, steel, etc. at the other of 22 or 24 will work similarly but with proportionally less force. Since schematically there is no difference in appearance, FIG. 1 suffices to illustrate these embodiments as well.

In all of the embodiments described above, the actuator itself is required to remain active to support the portion of the return load from the tool being actuated that is not supported by the counterbalance system. In another embodiment however, the counter balance will hold all of the load but the part of the load that would otherwise (in a foregoing embodiment) be borne by the actuator will be borne by a failsafe configuration of the counterbalance. The actuator may be allowed to go dormant. In this embodiment, the same or another coil is incorporated into the counterbalance system at 22 or 24, or both, the coil supporting the balance of the return load that is not supported by the functional characteristics of the counterbalance system as described above. Using the same force numbers used above, the counterbalance system of this embodiment will hold 180 lbs and a specifically activated coil or one of the coils as noted above will hold greater than 20 pounds, i.e. the balance of the load. Since all of the load of the power spring is supported in this embodiment, there is no need to continue to power the actuator. The failsafe function will be electrically transferred to the electromagnet. In an embodiment where the counterbalance is permanent magnet based, an additional coil would be necessary, but where a coil is already a part of the counterbalance, it is possible to simply make that coil generate a stronger holding force to match or exceed the return force. In addition, it is always possible to maintain the same coils and their configuration as in the previous embodiments, where the counterbalance force is necessarily less than 100 percent of the return force and add another coil that is failsafe and is configured to provide sufficient force to hold the portion of the return force not held by the counterbalance portion. The representation of FIG. 1 applies to this embodiment as well.

While preferred embodiments have been shown and described, modifications and substitutions may be made thereto without departing from the spirit and scope of the invention. Accordingly, it is to be understood that the present invention has been described by way of illustrations and not limitation.

The invention claimed is:

1. A counterbalance system comprising:
   a first structure being one of receptive to a magnetic field or configured to produce a magnetic field; and
   a second structure being one of receptive to a magnetic field or configured to produce a magnetic field, one of the first structure and the second structure being in operative communication with a mobile portion of an actuator system and the other of the first structure and the second structure being positionally fixed relative to the actuator, the first structure and the second structure when brought together being attractive to one another sufficient to produce a force of less than 100 percent of a return force in a tool component actuated by the actuator, both the first and the second structures being separate from a powered assembly for the actuator system.

2. An actuator and counterbalance system comprising:
   an actuator including:
      a nonmobile carrier;
      a mobile carrier, mobile relative to the nonmobile carrier;
      a powered assembly operatively arranged for moving the mobile carrier;
   a first portion of a counterbalance system in operable communication with the mobile carrier and configured to counterbalance less than 100 percent of a return force of a tool component actuated by the actuator, the first portion separate from the powered assembly of the actuator; and a second portion of the counterbalance system configured to hold the balance of the return force not held by the first portion of the counterbalance system, the second portion separate from the powered assembly of the actuator.

3. An actuator and counterbalance system as claimed in claim 2 wherein the counterbalance system is mounted to the nonmobile carrier.

4. An actuator and counterbalance system as claimed in claim 2 wherein the counterbalance system comprises a magnet field producing structure positioned in spaced relationship to the mobile carrier when the actuator is unactuated and a proximate relationship to the mobile carrier when the actuator is actuated.

5. An actuator and counterbalance system as claimed in claim 4 wherein the magnetic field producing structure comprises one or more permanent magnets.

6. An actuator and counterbalance system as claimed in claim 4 wherein the magnetic field producing structure comprises a single permanent magnet.

7. An actuator and counterbalance system as claimed in claim 4 wherein the magnetic field producing structure is one or more coils.

8. An actuator and counterbalance system as claimed in claim 2 wherein the counterbalance system comprises a magnet field producing structure positioned at an end of the mobile carrier.

9. An actuator and counterbalance system as claimed in claim 8 wherein the magnetic field producing structure comprises one or more permanent magnets.

10. An actuator and counterbalance system as claimed in claim 8 wherein the magnetic field producing structure comprises a single permanent magnet.

11. An actuator and counterbalance system as claimed in claim 8 wherein the magnetic field producing structure is one or more coils.

* * * * *